United States Patent Office

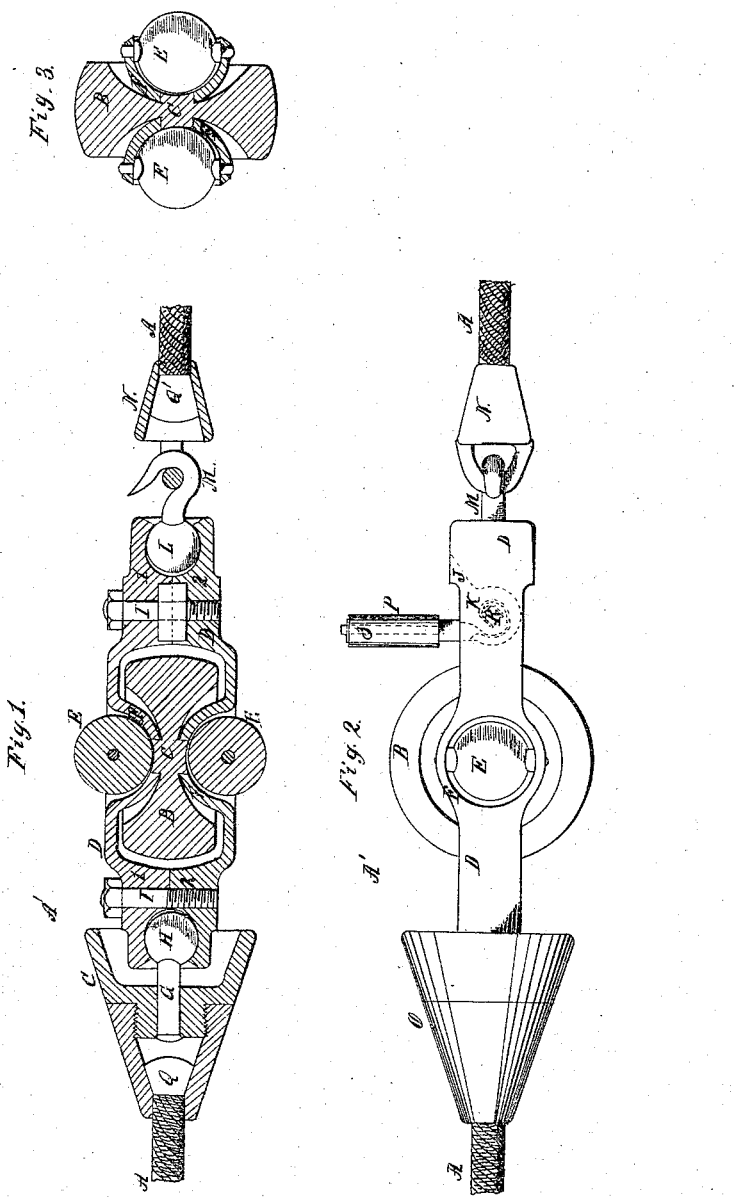

CHARLES T. HARVEY, OF TARRYTOWN, NEW YORK.

Letters Patent No. 63,887, dated April 16, 1867.

IMPROVED CAR-PROPELLING APPARATUS.

*The Schedule referred to in these Letters Patent and making part of the same.*

TO ALL WHOM IT MAY CONCERN:

Be it known that I, CHARLES T. HARVEY, of Tarrytown, in the county of Westchester, and State of New York, have invented a new and useful improvement in Heads or Ferrules of Propelling Ropes or Cables; and I do hereby declare that the following is a full, clear, and exact description thereof, which will enable others skilled in the art to make and use the same, reference being had to the accompanying drawing, forming part of this specification, in which drawing—

Figure 1 is a central longitudinal section of my improvement.

Figure 2 is a side elevation.

Figure 3 is a cross-section through the axial line of the vertical roller B.

This invention relates to propelling apparatus for moving or propelling railway cars or other vehicles, or towing vessels, where a rope or cable that is kept in continual motion is used for moving or propelling cars, vehicles, or vessels.

The invention consists, among other things, in a novel mode of constructing and uniting to each other the several parts of heads or ferrules of propelling ropes, and of connecting such heads or ferrules to such ropes; also, in means for preventing friction between the ferrules and the sides of a trough or guiding channel in which the propelling rope or cable moves, such, for instance, as that described in my Letters Patent issued May 8, 1866, and antedated April 6, 1866; also in means for preventing the ferrules from turning in such trough or channel.

The letter A designates a propelling rope or cable, and A' one of the heads or ferrules which effect connection between the rope or cable and the cable clutch or other grappling device projected from a car, as specified in my said patent. The forward conical part of the ferrule, which is immediately in contact with such clutch, is marked O, the red line marking the place of the joint between its several sections when the conical part of the ferrule is made with joints, as specified in said patent. From the base or rear portion of the said part O extends a link, G, whose rear end is made spherical, as at H, to form a universal joint with the part D of the ferrule, so as to make the ferrule capable of being bent out of a straight line, as when turning a curve or angle. The rear portion N of the ferrule is a hollow conical coupling-shell, N, having a bail projecting from its base, through which bail a hook, M, or other suitable fastening device is passed to form a connection with the other portions of the ferrule. When a hook like M is used the opening of the hook may be closed by a strand of wire or other device to prevent the release of the bail. The shank of the hook has a spherical end, L, which is enclosed within a socket in the rear end of the part D of the ferrule so as to form a flexible or universal joint similar to that at the forward end of the ferrule. The rope or cable is connected with the ends of the ferrule by means of conical heads Q Q', which fit within conical cavities formed in the parts O and N. The part D consists of a frame, made in this example in two sections, marked 1 and 2, which are held together by bolts I I, the adjacent sides of each section, at its ends, having formed therein semi-spherical cavities which constitute sockets for holding the spherical ends of the link G and the hook M, respectively, when the sections are united. This construction and arrangement permit the ends of the ferrule to be bent out of line with each other and with the rest of the ferrule without endangering their connections. The middle portions of the sections of frame D are cut out or shaped so as to produce, when the sections are brought together, a vertical opening or mortise, which contains the vertical anti-friction roller B, said roller B being made in the form of a zone with depressed or concave sides for the purpose both of providing places in or at the sides thereof for lateral anti-friction rollers and of making the anti-friction surface of such roller B concentric or nearly concentric with the part of the cable guide with which it comes in contact, so that the head or ferrule, or its frame D, may roll sideways or oscillate without preventing the said spheroid from fulfilling its office of an anti-friction rolling surface to said head or ferrule. This roller is of greater diameter than the frame, and its circumference projects both above and below the said frame so that no other part of the frame will come in contact with the lower and upper sides of the channel described in my said patent, in which the rope or cable travels. The like result is accomplished for the sides of the frame by means of lateral anti-friction rollers E E, placed in semi-spherical sockets $ff$, formed in said sides, and turning on axes which are at right angles with the axis of vertical roller B. The sockets $ff$ are at points opposite the concavity of the large roller B, and their convex sides form the bearings of the axis C of that roller. The journals of the lateral rollers E E turn in bearings provided in the sides of the sockets $ff$, as shown in figs. 2 and 3, and the circumference of the rollers projects beyond the sockets far enough to prevent contact between the solid parts of the sides of the frame D and the guiding channel before mentioned, when such frame oscillates from side to side. The roller B is wide enough to reach across any openings made in the upper or lower sides of such guiding channel when the ferrule A' or the part which carries the roller is in a vertical position; and when it is tilted over to one side or the other the corresponding roller E comes in contact with the guiding channel and takes up or prevents friction between the ferrule and such channel. I have provided means for preventing the turning of the frame D in the guiding channel of my said patent by placing a yielding finger, P, on the upper side of the frame so that it can project upward through the top opening of such channel. The said finger is surrounded by an anti-friction roller, 3, and it is connected to the frame by placing its lower end in a mortise, J, across which the hinder bolt I passes. The lower end of the finger terminates in a curved spring, fastened or let into a slot in a square collar, R, about which the spring is bent, as shown in fig. 2, the collar being placed on that part of the bolt (also made square at that place) which lies in said mortise. The mortise is extended backward, as shown in dotted outline in fig. 2, to permit the finger to lie prostrate, or nearly prostrate, against the rear end of the frame when the said finger is forced downwards and backwards by any obstacle. Such an obstacle will occur when the coupling-clutch of my said patent, that connects a car to the rope or cable A, is disconnected or stationary while the rope or cable is in motion. In passing such a clutch the finger will be pressed backwards thereby, and when it has passed the clutch the force of the spring K will restore it to an upright position so that it can project into or through the top of said cable trough or guiding channel, as before explained.

Among the advantages which result from the construction and arrangement above set forth is the flexibility or capability of bending of the ferrule A' at the places where its parts are joined to each other and to the ends of the rope A. Another advantage is the facility which is obtained in uniting the several parts of the ferrule by making the part D in longitudinal sections 1 2, and securing the vertical roller B and the joints H L by placing them in their appropriate places in one section and then bringing the sections together and fastening the bolts I.

Having thus described my invention, what I claim, and desire to secure by Letters Patent, is—

1. I claim the combination of the lateral rollers E E with the large roller B, the axis of the latter being at a right angle with the axes of the former, substantially as shown.

2. I also claim the ferrule A' composed of a conical forward part, O, a frame D, and a rear part, N, the several parts being connected by joints which permit of lateral motion of such parts, substantially as set forth.

3. I also claim the construction and arrangement of the ferrule A or its body or portion that contains the anti-friction rollers in sections 1 2, substantially as set forth.

4. I also claim the yielding finger or ferrule guide P, substantially as set forth.

5. I also claim the combination of the hook M connected to the part D, as shown, the conical shelf N, and the conical end Q' of the rope or cable A', substantially as shown.

6. I also claim the combination of the link G, connected to the part D, as shown, by a universal joint, with the conical forward part O of the ferrule, substantially as shown.

The above specification signed by me this seventeenth day of December, 1866.

CHARLES T. HARVEY.

Witnesses:
AMASA A. REDFIELD,
J. VAN SANTVOORD.